FIG. 4

Oct. 16, 1956  K. C. CUMMINGS  2,766,953
FLIGHT SCHEDULING APPARATUS
Filed July 16, 1951  5 Sheets-Sheet 5

INVENTOR.
KIMBALL C. CUMMINGS
BY
George H Fisher
ATTORNEY

United States Patent Office 2,766,953
Patented Oct. 16, 1956

2,766,953

FLIGHT SCHEDULING APPARATUS

Kimball C. Cummings, Minneapolis, Minn., assignor to Minneapolis-Honeywell Regulator Company, Minneapolis, Minn., a corporation of Delaware Application July 16, 1951, Serial No. 237,007

7 Claims. (Cl. 244—77)

This invention relates to the field of aircraft control apparatus, and more particularly to apparatus for controlling the power of a craft either manually or in accordance with one or more selected conditions, which may be airspeed, ground speed, or similar conditions.

The purpose of the present invention is to provide means whereby the engines of a craft may be controlled, at the will of the pilot, in accordance with any of the conditions mentioned above, and in accordance with a desired value of power which may be selected either manually or automatically through a suitable remote positioning system.

Accordingly, an object of the invention is to provide aircraft control apparatus in which there are provided ground speed responsive means and airspeed responsive means, and in which the power of the craft may be controlled from the ground speed responsive means and from the airspeed responsive means.

It is a further object of the invention to provide aircraft control apparatus having two controlling conditions, one in which a power controller is operated in accordance with the adjustment of a manual power selector, and the other in which both the power controller and the manual power selector are operated in accordance with the amount by which the craft is ahead of or behind its schedule.

A further object of the invention is to provide aircraft control apparatus having power control means and means causing operation thereof in accordance with the adjustment of a manual power selector by an automatic power selector, or in accordance with the outputs of airspeed control means or of ground speed control means.

Yet another object of the invention is to provide aircraft control apparatus in which power control means for the craft is normally operated in accordance with the operation of a manual power selector, but may also be operated from a plurality of further selectors, and in which the manual power selector is automatically adjusted in synchronism with the power control means when any of the further selectors is operated.

A more specific object of the invention is to provide a new and improved arrival time selector.

Various other objects, advantages, and features of novelty which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described a preferred embodiment of my invention. In the drawing:

Figure 1:
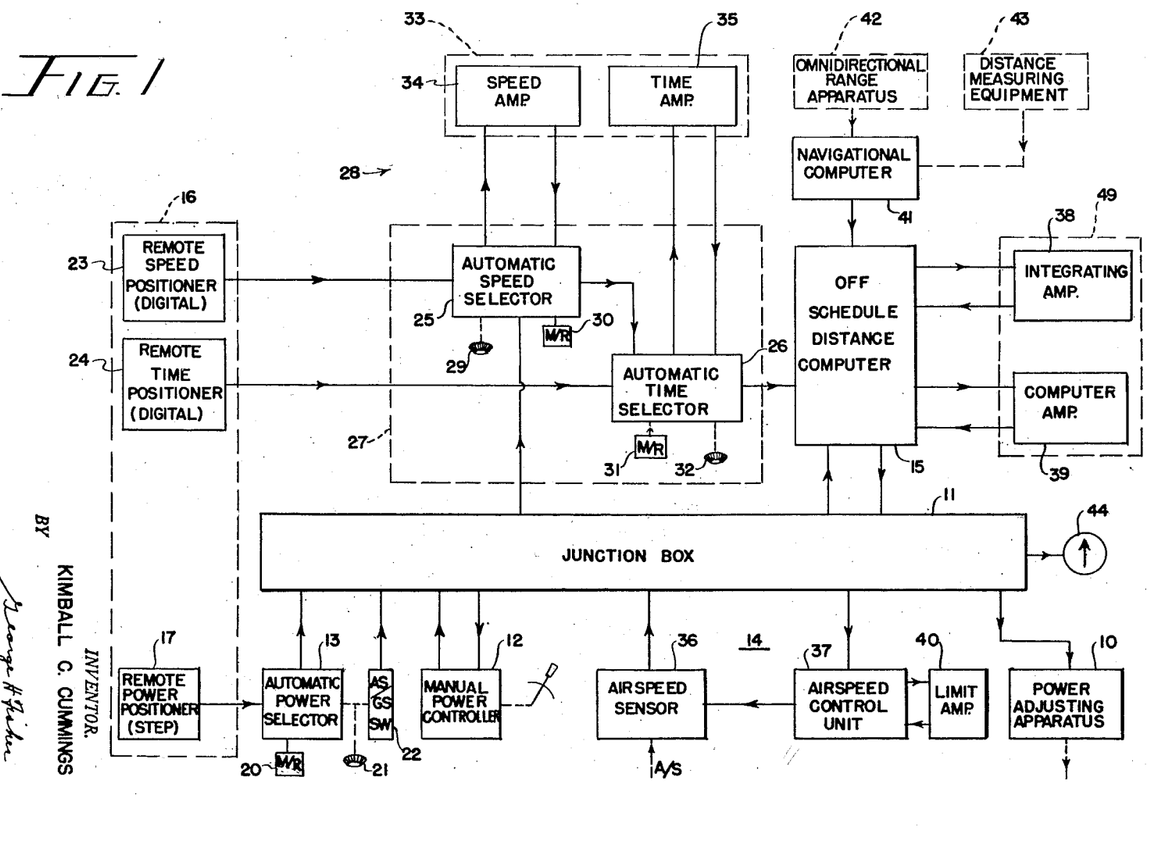
Figure 1 is a block diagram illustrative of the general interrelationship of the major components making up my invention.

In the lower right hand corner of Figure 1 there is shown power adjusting apparatus 10 which functions to control the throttles or other power control means of the engines of the craft in accordance with a mechanical input supplied thereto. This input is governed by a number of signals selected for apparatus 10, in a junction box 11, from a plurality of input signal devices including a manual power controller 12, an automatic power selector 13, airspeed selecting apparatus indicated generally by the reference numeral 14, and ground speed selecting apparatus such as an off-schedule distance computer indicated by the general reference numeral 15.

Power adjusting apparatus 10 may conveniently comprise any known means for varying the power settings of the engines of an aircraft from a single adjusting device, and may include such inter-engine coordinating means, individual engine manual override arrangements, and so on as are considered desirable. One apparatus suitable for this use is shown in Chudyk Patent 2,485,431, in which slider 278 is the single adjusting device.

Cooperating with the apparatus just identified is a remote control unit 16 which includes a remote power positioner 17. Positioner 17 is arranged to provide a control signal to automatic power selector 13 when a manual-remote switch 20 is in its remote condition. When switch 20 is in its manual position, power selector 13 is controlled by a manual knob 21, which also controls the operation of an airspeed-ground speed switch 22, when the knob is advanced to an extreme position.

Remote control unit 16 also includes a remote speed positioner 23 and a remote time positioner 24. These units cooperate respectively with an automatic speed selector 25 and an automatic time selector 26, which may be conveniently located on a common selector chassis 27, to comprise telemetric means for adjusting the selectors remotely. Manual operating knobs 29 and 32, may be provided in connection with selectors 25 and 26, and manual-remote switches 30 and 31 may be included to make possible control of the selectors either from the remote positioners or from the manual knobs, at the choice of the human operator. A common motor control amplifier chassis 33 carries a speed amplifier 34 cooperating with speed selector 25, and a time amplifier 35 cooperating with time selector 26. Elements 29 to 35 make up a schedule distance computer identified by the reference numeral 28.

Airspeed control apparatus 14 includes an airspeed sensing unit 36, an airspeed control unit 37, and a limiting amplifier 40.

Cooperating with computer 15 are an integrating amplifier 38 and a computer amplifier 39, which may be conveniently constructed on a common amplifier chassis 49. Computer 15 is provided with a first input from time selector 26 and a second input from a navigational computer 41, which may be of any suitable type supplying an output which varies in accordance with the distance between a craft and its desired destination. In the embodiment of the invention shown in Figure 1, the computer is of the type shown in the copending application of Oscar Hugo Schuck, Serial No. 33,608, filed June 17, 1948, and assigned to the assignee of the present application, and is indicated as being actuated in accordance with the signals from an omnidirectional range apparatus 42 and a distance measuring equipment installation 43.

Also energized from computer 15, through junction box 11, is an indicator 44.

Figure 2:
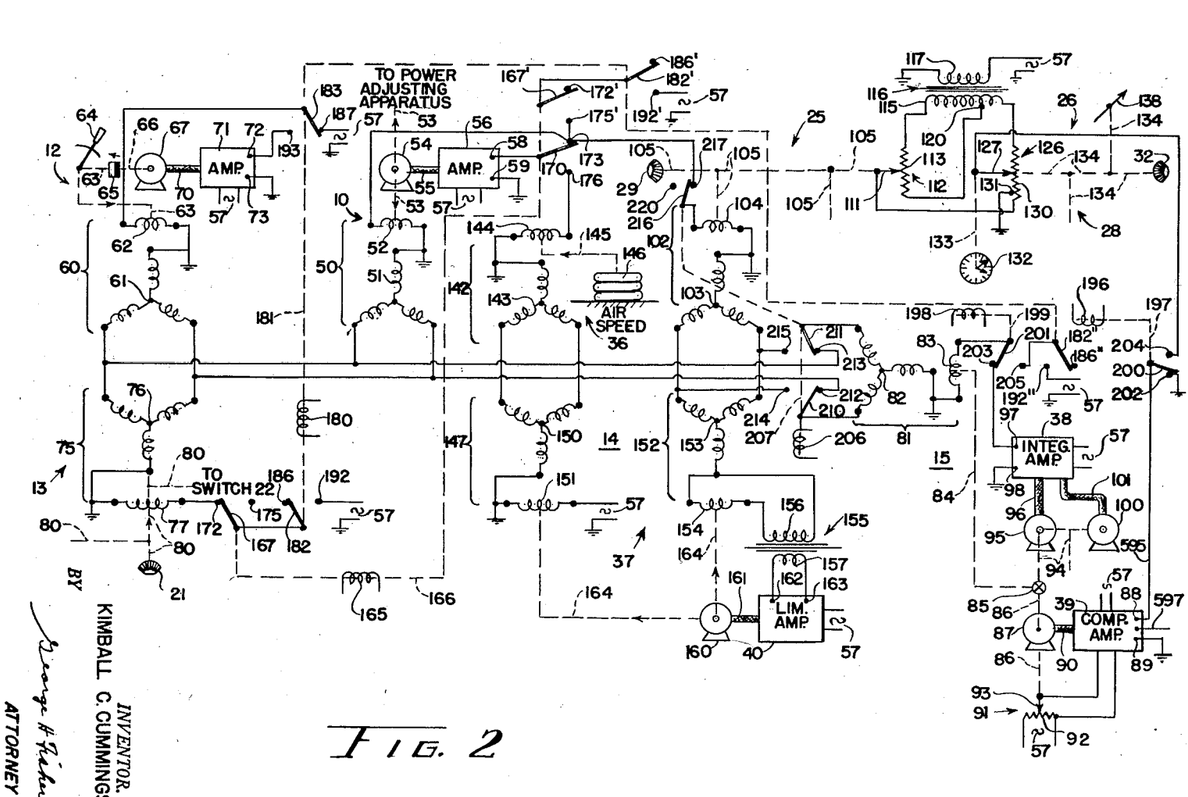
Figure 2 is a schematic drawing of the interrelationship between the signal sensing and responsive portions of my invention.

In the more detailed functional showing of Figure 2, power control apparatus 10 is shown in the upper left central portion of the figure to comprise a power servo including a self-synchronous device 50 made up of a stator and a rotor in mutually inductive relationship. A number of such devices are included in the apparatus, and each will be referred to hereafter as a synchro, with an associated adjective identifying its general function. The three-phase stator winding of "servo" synchro 50 is indicated at 51, and the single-phase rotor winding is shown at 52 as being driven through a mechanical connection 53 by a motor 54 energized through a suitable cable 55 from an amplifier 56 powered from a source 57 of alternating voltage, and having input terminals 58 and 59, the latter being grounded. Mechanical connection 53 of motor 54 is extended to operate the power adjusting apparatus, as by moving the control slider in the Chudyk patent referred to above. It is of course understood that motor 54 includes such reduction gearing as is necessary to provide sufficient torque for the operation of the power controls, and also includes suitable limit switches for determining the range of travel of the power controls. The position of rotor 52 with respect to stator 51 is adjusted by motor 54 simultaneously with adjustment of the power controls.

Motor 54 is of the type which operates in a forward or a reverse direction depending upon the phase relationship between the currents in a pair of windings arranged in space quadrature.

Amplifier 56 energizes the "line" winding of motor 54 in continuous quadrature to the alternating voltage supplied by source 57, and energizes the "amplifier" winding of the motor in accordance with the signal impressed on the input terminals 58 and 59 of the amplifier, which signal is in phase or 180° out of phase with the voltage of source 57, according as the power setting is less or greater than that desired.

Manual power controller 12, as shown in the upper left hand corner of Figure 2, includes a "manual" synchro 60 having a three-phase stator winding 61 and a single phase rotor winding 62, driven with respect to stator 61 by a shaft 63 which carries a manual operating lever 64. Shaft 63 is extended by means of a friction clutch 65 to be driven by the shaft 66 of a motor 67 having the same characteristics as motor 54 previously described. Motor 67 is energized through a cable 70 from an amplifier 71 like amplifier 56, powered from source 57, and provided with input terminals 72 and 73, the latter being grounded.

Automatic power selector 13 as shown at the lower left of Figure 2 comprises an "automatic" synchro 75 having a three-phase stator winding 76 and a single phase rotor winding 77. Rotor 77 is positioned with respect to stator 76 by manual knob 21 through a mechanical connection 80, which is extended to the left as seen in the figure for automatic operation from a remote control point, and which is extended to the right for operative connection to airspeed-groundspeed switch 22.

Computer 15 is shown in the lower right hand corner of Figure 2 to comprise a "groundspeed" synchro 81 including a three-phase stator winding 82 and a single phase rotor winding 83. Winding 83 is positioned with respect to winding 82 by means of a mechanical connection 84 comprising the output of a mechanical differential 85. A first mechanical input to differential 85 is supplied by the shaft 86 of a motor 87 having the same characteristics as motor 54, and energized through a cable 90 from computer amplifier 39. Also actuated by shaft 86 of motor 87 is a voltage divider 91 comprising a winding 92 and a slider 93. Winding 92 is energized from source 57 and supplies a rebalance signal for amplifier 39. This amplifier is powered from source 57, and has input terminals 88 and 89, the latter being grounded. The input for computer amplifier 39 will be further described below.

A second mechanical input to differential 85 is supplied on the shaft 94 of a motor 95 energized through cable 96 from integrating amplifier 38, which is powered from source 57 and which has input terminals 97 and 98, the latter being grounded. The input circuit for integrating amplifier 38 will also be described below. Shaft 94 of motor 95 is extended to drive a velocity generator or dynamic transformer 100, which is connected through a cable 101 to integrating amplifier 38. Velocity generator 100 is a device having a primary winding continuously energized with alternating voltage from source 57, and a secondary winding in which an alternating voltage is induced which is of the same frequency as that in the primary winding, and which varies in magnitude and reverses in phase with variation in the speed and reversal in the direction of operation of motor 95.

Automatic speed selector 25 is shown at the upper right center of Figure 2 to comprise a "reference" synchro 102 having a three-phase stator winding 103 and a single phase rotor winding 104. Winding 104 is rotated with respect to winding 103 by a shaft 105 which carries knob 29, and which is extended downward for motor actuation. Shaft 105 is further extended to operate the slider 111 of a voltage divider 112 having a winding 113, energized from the secondary winding 115 of a transformer 116, whose primary winding 117 is connected to source 57: winding 115 has a tap 120 spaced one-fourth of its length from one end.

Automatic time selector 26 is shown in the upper right hand corner of Figure 2 to comprise a voltage divider 126 including a slider 127 and a winding 130 having a tap 131 spaced ⅜ of its length from one end thereof. A clockwork mechanism 132 is arranged to drive slider 127 through a mechanical connection 133, concurrently with movement of the minute hand of the clock. Winding 130 is arranged for energization from secondary winding 115 of transformer 116 through voltage divider 112, and winding 130 is also arranged for movement, relative to slider 127, by a shaft 134 which carries manual knob 32 and an index 138, and which is extended downward for motor actuation.

Airspeed sensor 36 is shown near the center of Figure 2 to comprise a "sensor" synchro 142 having a three-phase stator winding 143 and a single phase rotor winding 144. Rotor 144 is rotated with respect to stator 143 through a mechanical connection 145 from an airspeed responsive device 146 which is shown as a bellows. Mechanical connection 145 may include such reduction gearing, and means for converting linear movement to rotary movement, as the nature of the airspeed responsive device makes desirable.

Airspeed control unit 37 is shown below the center of Figure 2 to comprise a "transmitter" synchro 147 having a three-phase stator winding 150 and a single phase rotor winding 151, a "receiver" synchro 152 having a three-phase stator winding 153 and a single phase rotor winding 154, a transformer 155 having a primary winding 156 and a secondary winding 157, and a motor 160 energized through a cable 161 from limiting amplifier 40, which is powered from source 57 and which has input terminals 162 and 163. Rotors 151 and 154 are rotated with respect to their stator windings by the shaft 164 of motor 160.

In the practice of the invention it is desired that the components defined above be connected together in a variety of different fashions, and in order to make this possible a plurality of switching devices are provided. The control circuits are shown more clearly in the complete wiring diagram of Figures 3 and 4, and the present functional diagram includes only so much of the switching mechanism as is necessary to explain the broad functions of the apparatus. Five relays are shown in fragmentary fashion in Figure 2, and will hereafter be referred to by the reference numbers of their windings. Certain contact sets are duplicated for simplicity of illustration: these duplications are indicated by priming or double-priming the reference numerals. Thus in the lower left hand portion of the figure there is shown the winding 165 of a relay whose armature 166 actuates a plurality of movable contacts 167, 170, and 167' out of normal engagement with a first set of fixed contacts 172, 173, and 172', and into engagement with a further plurality of fixed contacts 175, 176, and 175'. The winding 180 of a second relay is shown just above winding 165 to actuate an armature 181 which displaces a plurality of movable contacts 182, 183, 182' and 182" out of normal engagement with a first set of fixed contacts 186, 187, 186' and 186" and into engagement with a further set of fixed contacts 192, 193, 192' and 192". In the right central portion of the figure are shown the windings 196 and 198 of a pair of relays whose armatures 197 and 199 respectively actuate a pair of movable contacts 200 and 201 out of normal engagement with a first pair of fixed contacts 202 and 203 and into engagement with a second pair of fixed contacts 204 and 205. Finally, near the center of the drawing, the winding 206 of a further relay is shown to actuate its armature 207 to displace a plurality of movable contacts 210, 211, and 216 out of normal engagement with a first set of fixed contacts 212, 213, and 217 and into engagement with a second set of fixed contacts 214, 215, and 220.

The apparatus described in the foregoing paragraphs has four different conditions of operation which may be identified by the adjectives manual, automatic, airspeed, and groundspeed. When the relays are in the position shown in Figure 2, the apparatus is in its manual condition, in which operation of the power controls of the craft takes place in accordance with operation of manual lever 64. It will be observed that single phase winding 62 of manual synchro 60 is energized from source 57 through contacts 183 and 187 of relay 180. Voltages are thus induced in the three-phase winding 61 of the synchro and are conducted to the three-phase winding 51 of servo synchro 50. At this time the single phase winding 52 of servo synchro 50 is connected to the input of amplifier 56 through contacts 173 and 170 of relay 165, and operation of motor 54 accordingly takes place, positioning winding 52 into agreement with the position of winding 62, at which time no output voltage is supplied by winding 52 to amplifier 56, and operation of motor 54 stops. This operation of motor 54 has, however, adjusted the power controls of the craft through mechanical connection 53 to the extent desired by the human pilot in operating manual handle 64.

The voltages in three-phase winding 61 of manual synchro 60 are also connected to the three-phase winding 76 of automatic synchro 75, but since the single phase winding 77 of this synchro is isolated from all other portions of the circuit at contacts 182 and 186 of relay 180, no change in the circuit takes place.

The voltages in three-phase winding 61 of synchro 60 are also connected to three-phase winding 82 of groundspeed synchro 81 through contacts 213 and 211 and contacts 212 and 210 of relay 206. Primary winding 83 of synchro 81 is connected to the input of integrating amplifier 38 through contacts 201 and 203 of relay 198, so that operation of motor 95 begins in a direction dependent upon the disagreement between the position of single phase winding 63 with respect to three-phase winding 61 and the position of single phase winding 83 with respect to three-phase winding 82. It will be observed that no balancing arrangement is provided for amplifier 38 and motor 95, except that the input signal at terminals 97 and 98 is opposed by the output from velocity generator 100. Motor 95 accordingly operates at a rate determined by the positional disagreement between manual synchro 60 and groundspeed synchro 81. This operation continues as long as the positional disagreement continues, and the effect of this operation of motor 95 is to adjust the position of single phase winding 83 by means of shaft 94, differential 85 and mechanical connection 84. When the two single phase windings are brought into positional agreement, the signal from winding 83 applied to the input of integrator amplifier 38 decreases, the speed of the motor also decreases, and the system comes into a condition of equilibrium with motor 95 deenergized.

In the automatic condition of the apparatus of Figure 2 relay 180 is energized. This results in energization of single phase winding 77 of automatic synchro 75 from source 57 through contacts 192 and 182 of relay 180 and contacts 167 and 172 of relay 165, and accordingly voltages are induced in three-phase winding 76 of the synchro. These voltages are conducted to three-phase winding 61 of manual synchro 60, whose single phase winding has been disconnected from source 57 at contacts 183 and 187 of relay 180, and has been instead connected to the input to amplifier 71 at contacts 183 and 193 of relay 180. Accordingly any disagreement between the position of winding 77 with respect to winding 76 and the position of winding 62 with respect to winding 61 results in the application of an input signal to amplifier 71, and motor 67 is energized to adjust the position of winding 62, and also of manual lever 64, until the positional agreement has been regained. At the same time the three-phase winding 51 of servo synchro 50 is energized, as described before, and the power controls of the aircraft are driven by motor 54 to a position determined by that of single phase winding 77. The three-phase winding 82 of groundspeed synchro 81 is also energized as before, and operates through motor 95 as previously described.

It is anticipated that the positioning of single phase winding 77 with respect to three-phase winding 76 is to be accomplished through any suitable telemetric system from a transmitter at a point remote from the synchro. This is especially desirable when it is contemplated to preset various conditions of an aircraft for flight through an extended course, and to follow the several sections of the flight automatically after the presetting has been accomplished. Knob 21 is useful, however, when the telemetric system is deenergized, or when it is desired to adjust the position of single phase winding 77 in finer increments than is possible using a given telemetric transmitter.

In the airspeed condition of the apparatus both relays 180 and 165 are operated. Under these conditions the single phase winding 104 of reference synchro 102 is excited from source 57 through contacts 216 and 217 of relay 206, contacts 175' and 167' of relay 165, and contacts 182' and 192' of relay 180. The voltages induced in three-phase winding 103 of synchro 102 are conducted to three-phase winding 153 of receiver synchro 152, and the output from single phase winding 154 of synchro 152 is coupled to amplifier 40 through transformer 155. Motor 160 accordingly operates, adjusting single phase winding 154 and also adjusting single phase winding 151 of transmitter synchro 147, which is energized from source 57. The three-phase winding 150 of synchro 147 is connected to three-phase winding 143 of sensor synchro 142, and the single phase winding 144 of synchro 142 is connected to amplifier 56 through contacts 176 and 170 of relay 165. Single phase winding 151 is accordingly positioned with respect to three-phase winding 150 in accordance with the setting of single phase winding 104 with respect to three-phase winding 103, and if the airspeed of the craft is not such as to result in a similar positioning of single phase winding 144 with respect to three-phase winding 143, operation of motor 54 takes place and the power controls are adjusted. At the same time, motor 54 adjusts single phase winding 52 of synchro 50, and a signal is transmitted through servo synchro 50 and manual synchro 60 to position manual lever 64 as previously described. The same signal is transmitted through servo synchro 50 and groundspeed synchro 81 to position single phase winding 83 of synchro 81 as has also been previously described.

Limiting amplifier 40 is arranged to modify the signal from airspeed synchro 102 before it is conducted to sensor synchro 142. This modification may be the insertion of components proportional to the rate of change of the signal, or may include means varying the speed of response to the system, or limiting the maximum magnitude or rate of change of the signal. It will be appreciated that if it is desired to use the unmodified signal, receiving and transmitting synchros 147 and 152, transformer 155, amplifier 40, and motor 160 may all be eliminated, three-phase winding 103 of airspeed synchro 102 in this case being connected directly to three-phase winding 143 of sensor synchro 142.

In the ground speed condition of the apparatus, relays 165, 180, 196, 198, and 206 are all energized. Under these conditions single phase winding 83 of groundspeed synchro 81 is energized from source 57 through contacts 201 and 205 of relay 198 and contacts 182" and 192" of relay 180. Three-phase winding 82 of synchro 81 is connected to three-phase winding 153 of synchro 152 through contacts 210 and 214 and contacts 211 and 215 of relay 206, to cause operation of motor 160 as previously described until winding 154 is positioned in accordance with the position of winding 83. Single phase winding 104 of reference synchro 102 is deenergized at contacts 216 and 217 of relay 206, so that operation of power control servo 54 now takes place in accordance with the position of single phase winding 83 with respect to three-phase winding 82, rather than in accordance with the position of single phase winding 104 with respect to three-phase winding 103. Operation of manual lever 64 also takes place as previously described.

Without going into complete detail at present, the general operation of the apparatus can be outlined as follows. In the manual condition of the apparatus, servomotor 54 is controlled in accordance with operation of lever 64 and synchro 81 follows. In the automatic condition of the apparatus servomotor 54 is controlled in accordance with operation of shaft 80, as by knob 21, and synchro 81 and lever 64 both follow. In the airspeed condition of the apparatus servomotor 54 is controlled in accordance with the relation between the setting of knob 29 and the response of member 146, and synchro 81 and lever 64 both follow. Finally, in the groundspeed condition of the apparatus servomotor 54 is controlled in accordance with synchro 81, which is adjusted in accordance with the off schedule distance of the craft, and lever 64 follows.

Figure 3:
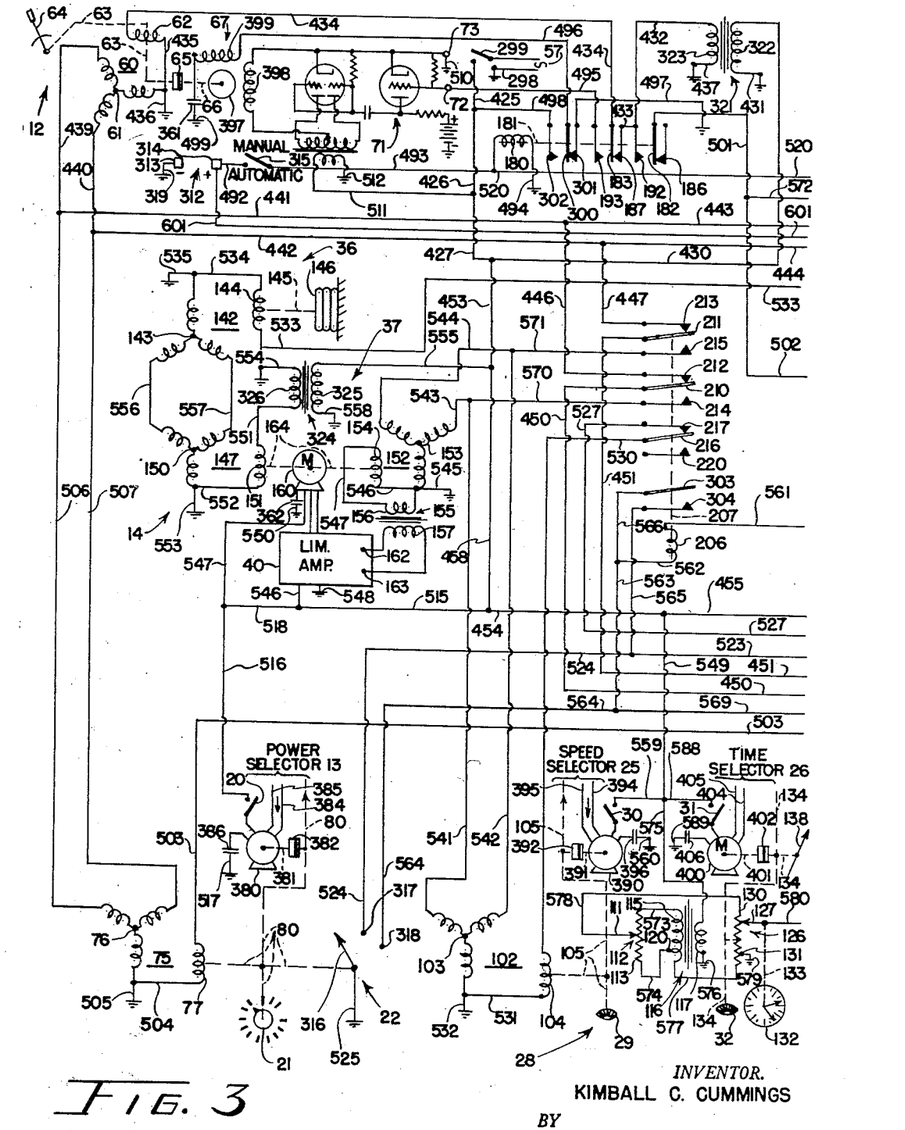
Figures 3 and 4 together comprise a wiring diagram of a preferred embodiment of the invention.
Figure 4:
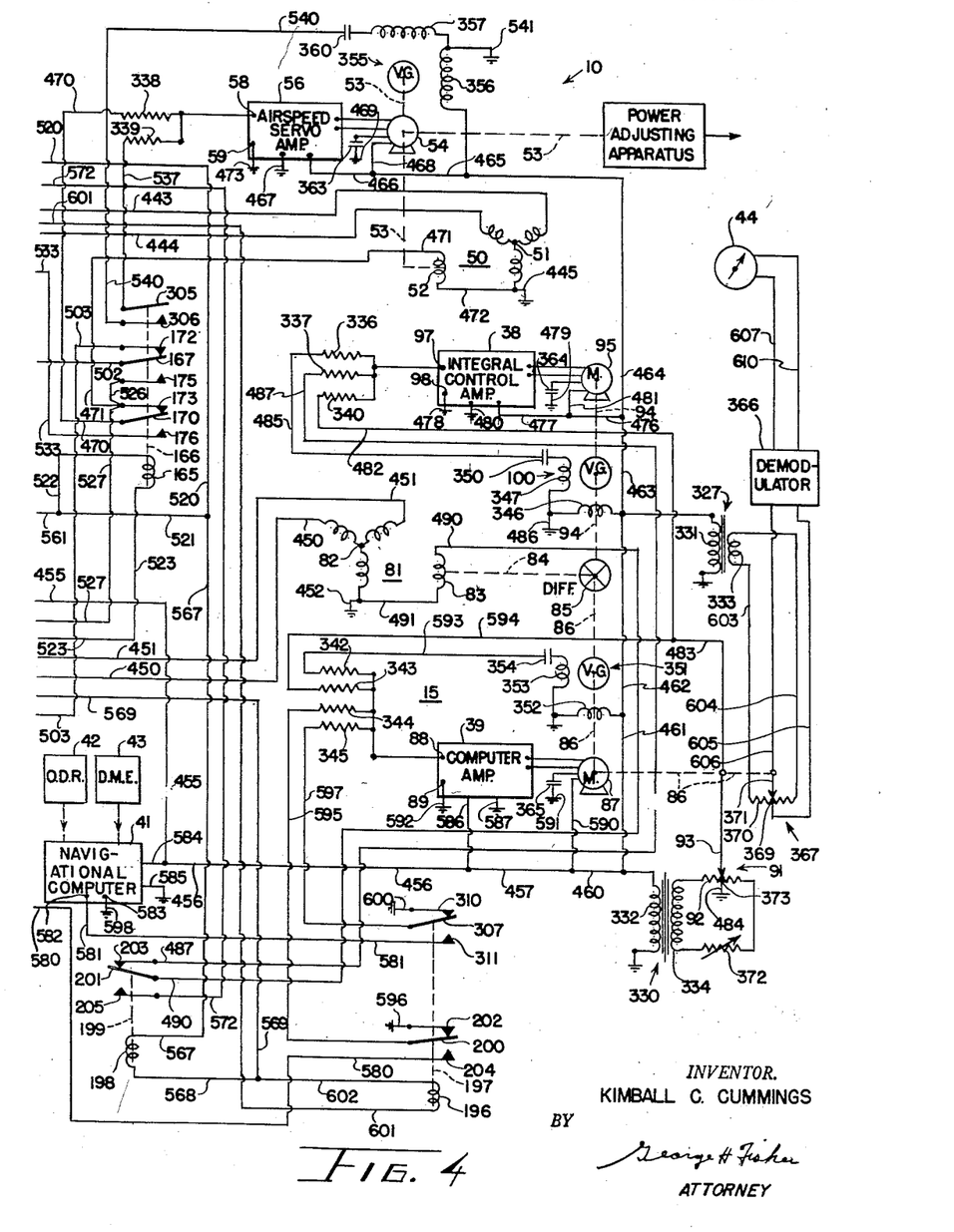
Figures 5, 6, 7, 8:
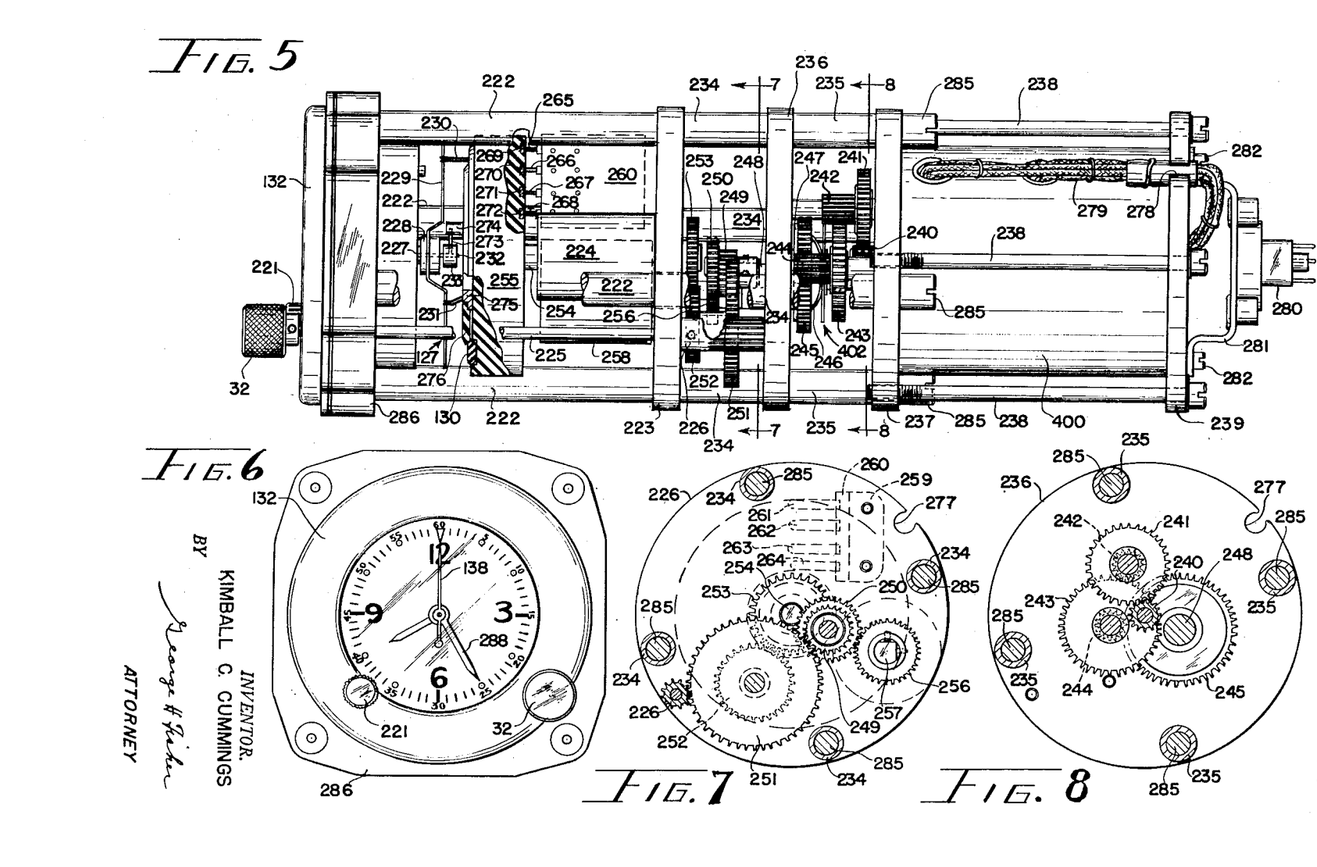
Figure 5 is a side elevation of an arrival time selector comprising a portion of the invention.
Figure 6 is a front view of the arrival time selector shown in Figure 5.
Figures 7 and 8 are sectional views taken along the lines 7—7 and 8—8 respectively of Figure 5.

Full circuit details of the apparatus described generally above are given in Figures 3 and 4, taken together, to which reference should now be made. Components already identified in previous discussion are given the same reference numerals in these figures.

In addition to elements previously described, a number of further components appear for the first time in Figures 3 and 4. Thus, power source 57 is shown in the upper portion of Figure 3 to have one grounded terminal 298, and to be controlled by a power switch 299.

Relay 180 is shown to be provided with a further movable contact 300 which normally engages a further fixed contact 301, but may be actuated out of that position, by armature 181 of relay 180, into engagement with a further fixed contact 302. Relay 206 in the right central portion of Figure 3 is shown to be provided with a further movable contact 303 which may be actuated by armature 207 of the relay into engagement with a fixed contact 304. Relay 165 in the left central portion of Figure 4 is shown to be provided with a further movable contact 305 which may be actuated by armature 166 of the relay into engagement with a further fixed contact 306. Relay 196 in the lower portion of Figure 4 is shown to comprise a further movable contact 307 which may be actuated out of normal engagement with a further fixed contact 310 and into engagement with a further fixed contact 311, by operation of armature 197 of the relay.

The windings of the relays just mentioned are energized from a suitable source 312 of unidirectional voltage shown in the upper left corner of Figure 3, whose negative terminal 313 is grounded at 319 and whose positive terminal 314 is connected to a single pole single throw switch 315. When this switch is open, the apparatus is in its manual condition: when the switch is closed, the apparatus is in its automatic, airspeed, or groundspeed condition, depending upon the operated condition of switch 22, shown in the bottom central portion of Figure 3 to comprise a movable contact 316 which may engage either of two fixed contacts 317 and 318, but which is out of engagement with both of these contacts through a major portion of its rotation.

Four transformers not previously described appear in Figures 3 and 4. In the upper right corner of Figure 3 there is shown a first synchro energizing transformer 321 having a primary winding 322 and a secondary winding 323. Near the center of Figure 3 there is shown a second synchro energizing transformer 324 having a primary winding 325 and a secondary winding 326. A pair of further transformers 327 and 330 are shown at the right of Figure 4 to comprise primary windings 331 and 332 and secondary windings 333 and 334 respectively.

Associated with integral control amplifier 38 just above the center of Figure 4 are plurality of summing resistors 336, 337, and 340. Associated with computer amplifier 39 shown below the center of Figure 4 are a plurality of summing resistors 342, 343, 344, and 345. Associated with servo amplifier 56 are a pair of summing resistors 338 and 339.

Velocity generator 100 is shown near the center of Figure 4 to comprise a primary winding 346 and a secondary winding 347, with which there is associated a phasing capacitor 350. Just below velocity generator 100 there is shown a further velocity generator 351 driven by motor 87 and comprising a primary winding 352 and a secondary winding 353 with which is associated a phasing capacitor 354. At the top of Figure 4 there is shown a further velocity generator 355 driven by motor 54, and comprising a primary winding 356 and a secondary winding 357 with which is associated a phasing capacitor 360.

The quadrature capacitors required for proper operation of motors 67 and 160 are explicitly shown in Figure 3 at 361 and 362, and those for motors 54, 95, and 87 are shown explicitly in Figure 4 at 363, 364, and 365.

A demodulator for indicator 44 is shown at 366 in the extreme right hand portion of Figure 4, and associated therewith is a voltage divider 367 comprising a winding 370 center-tapped at 369 and a movable contact 371. Figure 4 also shows in its lower right hand corner a variable resistor 372. This resistor is associated with transformer 330 and voltage divider 91, whose winding 92 is shown to be center-tapped at 373.

Also shown at the bottom of Figure 3 in schematic fashion are the output portions of power selector 13, speed selector 25, and time selector 26. Thus in the lower left portion of Figure 3 power selector 13 is shown to include a motor 380 whose shaft 381 is connected through a friction clutch 382 to shaft 80, the latter being extended upwardly to perform such balancing functions as are necessary in the power selector. Motor 380 is like motor 67, having an amplifier phase winding energized through conductors 384 and 385 and a line phase winding with which there is associated a quadrature capacitor 386, and which is energized under the control of switch 20.

Speed selector 25 is shown at the lower right hand portion of Figure 3 to include a motor 390 whose shaft 391 is connected through a friction clutch 392 to shaft 105, the latter being extended upwardly to perform such balancing functions as are necessary in the speed selector. Motor 390 has an amplifier phase winding energized through conductors 394 and 395, and a line phase winding with which there is associated a quadrature capacitor 396, and which is energized under the control of switch 30.

Time selector 26 is shown to include a motor 400 whose shaft 401 is connected through a friction clutch 402 to shaft 134, which is extended upwardly to perform such balancing functions as are necessary in time selector 26. Motor 400 includes an amplifier phase winding energized through conductors 404 and 405, and a line phase winding with which there is associated a quadrature capacitor 406, and which is energized under the control of switch 31.

Motor 67 is shown in the upper left hand corner of Figure 3 to comprise a rotor 397 carried on shaft 66 for rotation with respect to a stator including an amplifier phase winding 398 and a line phase winding 399. The windings comprised in the stator are physically displaced by 90 electrical degrees, so that when the windings are energized, rotor 397 operates in one direction or the other depending on which of the two windings is energized with a leading phase.

Operation

It is obvious that power adjusting apparatus 10 has a range of adjustment between minimum and maximum power settings. The apparatus is set up so that operation of motor 54 to drive the adjusting apparatus through this range produces a selected total angular displacement of single phase winding 52. The connection between manual lever 64 and single phase winding 62 produces this selected angular displacement of winding 62, for movement of the lever through its full range of operation. The connection between shaft 80 and winding 77 produces the selected angular displacement of the winding for rotation of knob 21 from its zero percent power position to its 100 percent power position: further rotation of the shaft to bring knob 21 into its airspeed and groundspeed positions is possible, but is ineffective electrically in the synchro system because of switching functions which take place.

The connection between airspeed responsive device 146 and single phase winding 144 is such that the winding is rotated through the selected angular displacement as the airspeed of the craft varies between minimum and maximum values determined by the stall characteristics of the craft and the ratings of its engines. The connection between shaft 105 and single phase winding 104 is such that the winding is rotated through the selected angular displacement for rotation of knob 29 between the same minimum and maximum values of selected speed. Motor 160 is connected to drive single phase windings 151 and 154 through the selected total angular displacement. The connection between shaft 84 and single phase winding 83 is such as to give the selected total angular displacement of the winding.

Manual power control

In the normal manual operation of the system, switch 299 is closed and switch 22 is open: it will first be assumed that switches 20, 30, and 31 are also open. Heater energization is supplied to amplifiers 38, 39, 40, 56, and 71 in conventional fashion. Computer 41, radio devices 42 and 43, and power adjusting apparatus 10 are all in operation, and clock 132 is running. Sliders 93 and 371 are centered on their windings. The craft is in stable flight with desired power adjustment.

Under these conditions, primary winding 322 of transformer 321 is energized from source 57 through switch 299, and conductors 425, 426, 427, and 430, and through ground connections 431 and 298. Single phase winding 62 of manual synchro 60 is energized from secondary winding 323 of transformer 321 through conductors 432 and 433, contacts 187 and 183 of relay 180, and conductor 434, and through conductor 435 and ground connections 436 and 437. Voltages are accordingly induced in the three phase winding 61 of the synchro, and are supplied to three phase winding 51 of servo synchro 50 through conductors 439 and 440, 441 and 442, and 443 and 444, and through ground connections 436 and 445.

The voltages in three phase winding 61 of manual synchro 60 are also supplied to three phase winding 82 of groundspeed synchro 81 on conductors 439 and 440, 441 and 442, and 446 and 447, fixed contacts 212 and 213 and movable contacts 210 and 211 of relay 206, and conductors 450 and 451, and through ground connections 436 and 452.

Amplifier 56 is supplied with alternating voltage from source 57 through switch 299, conductors 425, 426, 427, 453, 458, 454, 455, 456, 457, 460, 461, 462, 463, 464, 465, and 466 and ground connections 467 and 298: the line phase winding of motor 54 is energized from conductor 465 through a branch conductor 468, and the circuit is completed through quadrature capacitor 363 and ground connections 469 and 298.

An input circuit for amplifier 56 may be traced from input terminal 58 through summing resistor 338, conductor 470, movable contact 170 and fixed contact 173 of relay 165, conductor 471, single phase winding 52 of servo synchro 50, conductor 472 and ground connections 445 and 473 to input terminal 59 of the amplifier. Since, however, the craft is in stable flight under the desired power adjustment, single phase winding 52 has already been adjusted into such a position that no input voltage is induced therein from three phase winding 51: there is therefore no input voltage to amplifier 56 from synchro 50 and no operation of motor 54 takes place.

Amplifier 38 is energized from source 57 through switch 299, conductors 425, 426, 427, 453, 458, 454, 455, 456, 457, 460, 461, 462, 463, 476, and 477, and through ground connections 430 and 298, and the line phase winding of motor 95 is energized from conductor 476 through a branch conductor 481, the circuit being completed through quadrature capacitor 364 and ground connections 479 and 298. The input to amplifier 38 is the parallel sum of voltages supplied through summing resistors 336, 337, and 340. Input terminal 98 of amplifier 38 is grounded at 478. Resistor 340 is grounded through conductors 482 and 483, slider 93, center tap 373, and ground connection 484. Resistor 336 is energized with the output of velocity generator 100 through conductor 485, capacitor 350, and ground connection 486. Resistor 337 is energized through conductor 487, fixed contact 203 and movable contact 201 of relay 198 and conductor 490 from single phase winding 83 of groundspeed synchro 81, the circuit being completed through conductor 491 and ground connection 452. As long, therefore, as there is any voltage induced in single phase winding 83, an input is supplied to amplifier 38 and motor 95 operates, driving winding 83 to a new position through shaft 94, differential 85, and shaft 84, until the signal in the winding is reduced to zero. The signal from secondary winding 347 of velocity generator 100 is the only other signal applied to the input of amplifier 38, and hence insures that the motor operates a speed proportional to the voltage supplied through summing resistor 337. When single phase winding 83 has been brought into the proper position with respect to three phase winding 82, operation of motor 95 ceases.

When the human pilot wishes to change the power settings of the aircraft, he changes the position of lever 64, thus acting through mechanical connections 63 to change the angular position of single phase winding 62 of manual synchro 60 with respect to three phase winding 61. The voltages induced in three phase winding 61 are now different from those previously induced therein, and the positions of single phase winding 52 and single phase winding 83 relative to their respective three phase windings are no longer such that no voltages are induced therein. Winding 83 accordingly supplies an input to amplifier 38, causing operation of motor 95 as described above, and single phase winding 52 energizes amplifier 56 to cause operation of motor 54 in a similar fashion. The apparatus comes to a new condition of equilibrium in which windings 83 and 52 have been adjusted to new positions with respect to their three phase windings, and in which power adjusting apparatus 10 has been set at a different value.

*Power selection*

Knob 21, automatic synchro 75, switch 22, motor 380, and switch 20 are preferably located in the navigator's compartment of the aircraft. When it is desired to have control of the power of the craft from this source, the human pilot closes switch 315, thus completing a circuit from positive terminal 314 of D. C. source 312 through conductor 492, switch 315, and conductor 493 to the winding of relay 180, the circuit being completed through ground connections 494 and 319 to the negative terminal 313 of the source. Relay 180 is actuated, disconnecting single phase winding 62 from secondary winding 323 at contacts 183 and 187. Winding 399 of motor 67 was grounded through conductor 496, movable contact 300 and fixed contact 301 of relay 180, and ground connection 497: this circuit is interrupted at the relay contacts.

Secondary winding 323 of transformer 321 now energizes single phase winding 77 of automatic synchro 75 through a circuit which may be traced through conductor 432, fixed contact 192 and movable contact 182 of relay 180, conductors 501 and 502, movable contact 167 and fixed contact 172 of relay 165, and conductor 503, and through conductor 504 and ground connections 505 and 437. Voltages are induced in three phase winding 76 depending on the rotated position of single phase winding 77 with respect thereto, and these voltages are conducted to three phase winding 61 of manual synchro 60 through ground connections 505 and 436 and through conductors 506 and 507 and conductors 439 and 440. Accordingly a voltage appears in single phase winding 62 of synchro 60 which depends on the rotated position of the single phase winding with respect to the three phase winding: if winding 62 is not positioned with respect to winding 61 in the same way that winding 77 is positioned with respect to winding 76, a voltage appears in single phase winding 62 and is impressed on the input to amplifier 71 through conductor 434, movable contact 183 and fixed contact 193 of relay 180, and conductor 495, and through conductor 435 and ground connections 436 and 510. Amplifier 71 is energized from source 57 through switch 299, conductors 425, 426, and 511 and ground connections 512 and 298. The amplifier phase winding 398 of motor 67 is accordingly energized with voltage having an alternating component of the frequency of source 57, and of a phase and magnitude determined by the positional disparity between windings 62 and 77. Line phase winding 399 of motor 67 is energized from source 57 through switch 299, conductors 425 and 498, fixed contact 302 and movable contact 300 of relay 180 and conductor 496, and through quadrature capacitor 361 and ground connections 499 and 298. Operation of motor 67 accordingly takes place in a direction to position winding 62 so as to reduce the voltage supplied to the input to the amplifier. When the adjustment has been completed, operation of the motor ceases, and manual lever 64 has been advanced to a position determined by the setting of knob 21.

The voltages induced in three phase winding 76 of servo synchro 75 are also conducted to three phase winding 51 of servo synchro 50 through ground connections 505 and 445 and through conductors 506 and 507, 441 and 442, and 443 and 444. Operation of servomotor 54 accordingly takes place, as previously described, until winding 52 is positioned with respect to winding 51 in the same fashion that winding 77 is positioned with respect to winding 76. Power adjusting means 10 is accordingly positioned in accordance with the positioning of the knob 21.

The voltages appearing on three phase winding 76 are also conducted to three phase winding 82 of groundspeed synchro 81 through ground connections 505 and 452 and through conductors 506 and 507, 441 and 442, and 446 and 447, fixed contacts 212 and 213 and movable contacts 210 and 211 of relay 206, and conductors 450 and 451. Motor 95 is accordingly operated, as also previously described, until winding 83 is positioned with respect to winding 82 the same as winding 77 is positioned with respect to winding 76.

It will thus be apparent that closing switch 315 is effective to transfer the control of servomotor 54 and integrator motor 95 from manual control lever 64 to knob 21, at the same time causing manual lever 64 to follow the adjustment of knob 21.

Knob 21 may be operated manually, wherever it is desired to have direct human control of the power of the craft from the navigator's position rather than from the pilot's position. However, it is often desirable to provide automatic change in the power settings of the craft as one of a set of changes made to accomplish one step in a sequence of flight operations extending from take-off at one airport to touch-down at a remote airport. When such operation of the apparatus is desired, the navigator closes switch 20, which results in energization of the line phase winding of motor 380 from source 57 through switch 299, conductors 425, 426, 427, 453, 458, 515, 518, and 516, and switch 20 and through ground connections 298 and 517 and quadrature capacitor 386. Now whenever a signal is supplied to the amplifier phase winding of motor 380 from the rest of the power selector, through conductors 384 and 385, the motor begins to operate through clutch 382 and mechanical connection 80, adjusting winding 77, knob 21, and movable contact 316 of switch 22, and at the same time acting to balance out the signals supplied on conductors 384 and 385. When the balancing out is completed, motor 380 stops, and single phase winding 77 has been set in accordance with the remote signal.

*Airspeed control*

The airspeed condition of the apparatus is achieved when movable contact 316 of switch 22 is moved into engagement with fixed contact 317, either by manual operation of knob 21, or by automatic selection through motor 380. A circuit may now be traced from positive terminal 314 of source 312 through conductor 492, switch 315, conductors 493, 520, 521, and 522, the winding of relay 166, conductors 523 and 524, fixed contact 317 and movable contact 316 of switch 22, and ground connections 525 and 319 back to negative terminal 313 of source 312. The resulting operation of relay 165 interrupts at contacts 167 and 172 the circuit energizing single phase winding 77 of synchro 75, and establishes two new energizing circuits. The first of these circuits may be traced from secondary winding 323 of transformer 321 through conductor 432, fixed contact 192 and movable contact 182 of relay 180, conductors 501 and 502, movable contact 167 and fixed contact 175 of relay 165, and conductors 526 and 471, to single phase winding 52 of servo synchro 50. The second of these circuits may be traced to fixed contact 175 of relay 165 as just described, then through conductors 526 and 527, fixed contact 217 and movable contact 216 of relay 206, and conductor 530 to single phase winding 104 of reference synchro 102, and then by conductor 531 and ground connections 532 and 437 back to the secondary winding of the transformer.

Operation of relay 165 further acts to disconnect single phase winding 52 of synchro 50 from amplifier 56 at contacts 170 and 173 and substitutes therefor an input circuit to amplifier 56 which may be traced from input terminal 58 through summing resistor 338, conductor 470, movable contact 170 and fixed contact 176 of relay 165, and conductor 533, to single phase winding 144 of sensor synchro 142, the circuit being completed through conductor 534 and ground connections 535 and 473 to terminal 59 of amplifier 56.

Operation of relay 165 completes a further circuit which may be traced from input terminal 58 of amplifier 56 through summing resistor 339, conductor 537, movable contact 305 and fixed contact 306 of relay 165, conductor 540, and phasing capacitor 360, to secondary winding 357 of velocity generator 355, the circuit being completed through ground connections 541 and 473 to terminal 59 of amplifier 56.

The voltages induced in three phase winding 103 of reference synchro 102 from single phase winding 104 are conducted to three phase winding 153 of receiver synchro 152 by conductors 541 and 542 and conductors 543 and 544, and through ground connections 532 and 545. The resulting voltage induced in single phase winding 154 is applied through conductors 546 and 547 to primary winding 156 of transformer 155, and the voltage induced in secondary winding 157 of the transformer is impressed on input terminals 162 and 163 of limit amplifier 40.

Amplifier 40 is provided with power from source 57 through switch 299, conductors 425, 426, 427, 453, 458, 515, and 546, the circuit being completed through ground connections 548 and 298. The line phase winding of motor 160 is energized from conductor 518 through a branch conductor 547, the circuit being completed through quadrature capacitor 362 and ground connections 550 and 298. It follows that if single phase winding 154 is not in the same position relative to three phase winding 153 as is single phase winding 104 of reference synchro 102 relative to three phase winding 103, amplifier 40 energizes motor 160 to adjust the position of winding 154. At the same time motor 160 adjusts the position of single phase winding 151 of receiver synchro 147 with respect to three phase winding 150.

Single phase winding 151 is energized from secondary winding 326 of transformer 324 through conductors 551 and 552 and ground connections 553 and 554. Primary winding 325 of transformer 324 is energized from source 57 through switch 299, conductors 425, 426, 427, 453, and 555, and ground connections 558 and 298. Accordingly voltages are induced in three phase winding 150 depending on the position of single phase winding 151 relative thereto, and these voltages are conducted to three phase winding 143 of sensor synchro 142 through conductor 556 and 557 and ground connections 553 and 535. Single phase winding 144 of synchro 142 is positioned with respect to three phase winding 143 by airspeed responsive device 36, and single phase winding 151 is adjusted with respect to three phase winding 150 by motor 160 and in accordance with the adjustment of single phase winding 104 of reference synchro 102 with respect to three phase winding 103, the latter adjustment being made through shaft 105 in accordance with the desired airspeed of the craft. Whenever there is a positional discrepancy between single phase windings 144 and 151 and their associated three phase windings, the actual airspeed of the craft is not that desired, and a voltage from single phase winding 144 is applied through conductor 533, fixed contact 176 and movable contact 170 of relay 165, conductor 470, and summing resistor 338, to input terminal 58 of amplifier 56, the circuit being completed through ground connections 473 and 535 and conductor 534.

Amplifier 56 energizes motor 54 which begins to operate, driving velocity generator 355 to give an output from secondary winding 357 proportional to the speed of operation of the motor. This output is fed back into amplifier 56 through summing resistor 339 as previously described and insures operation of motor 54 at a rate determined by the deviation of the craft's actual airspeed from the desired airspeed. When motor 54 has operated power adjusting apparatus 10 sufficiently to correct the airspeed discrepancy, operation of motor 54 is interrupted. While motor 54 is operating, it adjusts the position of single phase winding 52 of servo synchro 50 with respect to three phase winding 51, thus changing the voltages induced in the three phase winding. These voltages are applied through conductors 443 and 444, 441 and 442, and 439 and 440, and through ground connections 436 and 445, to the three phase winding 61 of manual synchro 60, thus inducing a voltage in single phase winding 62 of synchro 60 which is applied to the input of amplifier 71, and causes operation of motor 67 to position the single phase winding so that no voltage is induced therein, and simultaneously to cause manual lever 64 to follow operation of motor 54.

The voltages induced in three phase winding 51 of servo synchro 50 are also supplied to three phase winding 82 of groundspeed synchro 81 through conductors 443 and 444, and 446 and 447, fixed contacts 212 and 213 and movable contacts 210 and 211 of relay 206, and conductors 450 and 451, and through ground connections 452 and 445. Motor 95 is energized as before to adjust the position of single phase winding 83 until no voltage is induced therein.

Shaft 105 may be positioned either by knob 29 or by motor 390. Knobs 29 and 32, motors 390 and 400, index 138, and clock 132 are located in the navigator's compartment, so that when switch 30 is open, the navigator may select a new air speed at any time simply by operation of knob 29. If it is desired to have control of airspeed made one of the functions to be included in each scheduled change in the operation of the craft, the navigator closes switch 30. The line winding of motor 390 is thereupon energized from source 57 through switch 299, conductors 425, 426, 427, 453, 458, 454, 549, and 559, and switch 30, the circuit being completed through quadrature capacitor 396 and ground connections 560 and 298. Thereupon remote control operation of speed selector 25 in every respect similar to the previously described remote control operation of power selector 13 may take place.

*Groundspeed control*

The groundspeed condition of the apparatus is established when movable contact 316 of switch 22 is moved into engagement with fixed contact 318 either by manual operation of knob 21 or by automatic selection through motor 380. This opens the previously traced circuit to ground from the winding of relay 165, and establishes a second circuit which may be traced from the positive terminal 314 of source 312 through conductor 492, switch 315, conductors 493, 520, 521, and 561, to the winding of relay 206, and thence through conductors 562, 563, and 564, fixed contact 318 and movable contact 316 of switch 22, and ground connections 525 and 319 back to the negative terminal 313 of source 312. Relay 206 operates, completing a circuit which may be traced from the positive terminal 314 of source 312 through conductor 492, switch 315, conductors 493, 520, 521, and 522, the winding of relay 165, conductors 523 and 565, fixed contact 304 and movable contact 303 of relay 206, conductors 566, 563, and 564, contacts 318 and 316 of switch 22, and ground connections 525 and 319 to negative terminal 313 of source 312. Thus relay 165 is energized in the groundspeed position of switch 22, as well as relay 206.

Operation of relay 165 has the same results as were previously described, except insofar as they are modified by operation of relay 206. The latter relay, for example, interrupts the circuit energizing single phase winding 104 of references synchro 102 at contacts 217 and 216.

It also disconnects the three phase winding 82 of groundspeed synchro 81 from three phase windings 61 and 51 at movable contacts 211 and 210, connecting winding 82 instead to three phase winding 153 of receiver synchro 152 through conductors 450 and 451, movable contacts 210 and 211 and fixed contacts 214 and 215 of relay 206, conductors 570 and 571, and conductors 543 and 544, the circuit being completed through ground connections 545 and 452. By this means synchro 81 is substituted for synchro 102 as the device for cooperating with airspeed responsive member 146 to control the operation of servomotor 54.

Movement of switch 22 into its groundspeed position completes a circuit which may be traced from positive terminal 314 of source 312, through conductor 492, switch 315, conductors 493, 520, and 567, the winding of relay 198, conductors 568, 569, and 564, contacts 318 and 316 of switch 22, and ground connections 525 and 319 to the negative terminal 313 of source 312. Relay 198 operates, disconnecting winding 83 of groundspeed synchro 81 from amplifier 38, and energizing it from secondary winding 323 of transformer 321 through conductor 432, fixed contact 192 and movable contact 182 of relay 180, conductors 501 and 572, fixed contact 205 and movable contact 201 of relay 198, and conductor 490, the circuit being completed through conductor 491 and ground connections 452 and 437. Synchro 81 is now a transmitter rather than a follower.

After adjusting knob 21 to its groundspeed position, it is necessary that shaft 105 be set, either by knob 29, or by motor 390, not to a selected airspeed, but to the scheduled groundspeed of the craft. Single phase winding 104 of reference synchro 102 is deenergized at contacts 216 and 220 of relay 206, and hence the change in its position is without effect on the apparatus, but shaft 105 also displaces slider 111 with respect to winding 113, and it is this function of shaft 105 which is made use of in the groundspeed condition of the apparatus. Winding 113 of voltage divider 112 is energized, through conductors 573 and 574, from the upper terminal and from tap 120 of secondary winding 115: primary winding 117 is energized from source 57 through switch 299, conductors 425, 426, 427, 453, 458, 454, 549, and 575, and through ground connections 576 and 437. Winding 130 of voltage divider 126 is energized from the lower terminal of secondary winding 115 and from slider 111 of voltage divider 112 through conductors 577 and 578. From this it will be observed that the voltage between the lower terminal of secondary winding 115 and slider 111 of voltage divider 112 is determined by the magnitude of the speed selected by adjustment of shaft 105, and that of this voltage a portion determined by the position of slider 127 with respect to winding 130 appears between slider 127 and tap 131. The latter tap is grounded at 579 to provide means whereby a negative signal may be transmitted from slider 127 simply by allowing slider 127 to go below tap 131.

Transformer 116, voltage dividers 112 and 126, knobs 29 and 32 and their shafts, and clock 132 and index 138 comprise a schedule distance computer. Slider 111 is set in accordance with the desired groundspeed of the craft, and shaft 134 is rotated so that index 138 indicates the time in the future at which a craft is to arrive at a desired destination. This adjusts the position of winding 130 with respect to slider 127, and the voltage between slider 127 and ground connection 579 is proportional to the product of schedule groundspeed and elapsed time, that is, to schedule distance. Thereafter clock 132 drives slider 127 downwardly along winding 130 with elapsing time, so that the schedule distance to destination decreases until at the end of the selected time its value is zero.

Slider 127 is connected by conductor 580 to fixed contact 204 of relay 196. Fixed contact 311 of relay 196 is connected by conductor 581 to one output terminal 582 of navigational computer 41: the other terminal 583 of computer 41 is grounded at 598.

If automatic rather than manual adjustment of the position of winding 130 is desired, the navigator closes switch 31, energizing the line phase winding of motor 400 from source 57 through switch 299, conductors 425, 426, 427, 453, 458, 454, 549, and 588 and switch 31, and through quadrature capacitor 406 and ground connections 589 and 298. Time selector 26 now operates in the same manner as power selector 13 previously described.

The construction and operation of computer 41 do not comprise inventive contributions in the present application, and are given in detail in the copending application previously referred to. It need merely be pointed out that this arrangement supplies at output terminals 582 and 583 an alternating voltage of the frequency of source 57 which varies in amplitude in accordance with the distance from the craft to its destination. To this end, the computer is energized from source 57 through switch 299, conductors 425, 426, 427, 453, 458, 454, 455, and 584, the circuit being completed through ground connections 585 and 298. Computer 41 is continuously adjusted in accordance with the bearing and distance of the craft from a particular radio transmitter, as supplied in terms of input from radio devices 42 and 43, and the computer includes manual means for adjusting it in accordance with the location of the station relative to a desired track, and in accordance with the direction of the desired track.

Amplifier 39 is supplied with power from source 57 through switch 299, conductors 425, 426, 427, 453, 458, 454, 455, 456, and 586, the circuit being completed through ground connections 587 and 298. The line phase winding of motor 87 is energized from conductor 457 through a branch conductor 590, the circuit being completed through quadrature capacitor 365 and ground connections 591 and 298. Terminal 89 of amplifier 39 is grounded at 592. Terminal 88 of the amplifier is energized through summing resistors 342, 343, 344, and 345.

Summing resistor 342 is connected through conductor 593 and phasing capacitor 354 to secondary winding 353 of velocity generator 351. Summing resistor 343 is energized through conductors 594 and 483 from slider 93 of voltage divider 91. Summing resistor 344 is grounded, when relay 196 is deenergized, through conductor 595, movable contact 200 and fixed contact 202 of relay 196, and ground connection 596. Summing resistor 345 is grounded, when relay 196 is deenergized, through conductor 597, movable contact 307 and fixed contact 310 of the relay, and ground connection 600. Thus, there is normally no input voltage supplied to amplifier 39, and motor 87 does not operate.

When switch 22 is moved to its groundspeed position, a circuit is completed from positive terminal 314 of source 312 through conductor 601, the winding of relay 196, conductors 602, 569, and 564, contacts 318 and 316 of switch 22, and ground connections 525 and 319 to negative terminal 313 of source 312. Relay 196 is now energized, ungrounding summing resistors 345 and 344 and connecting them to the navigating computer and the schedule distance computer, so that voltages proportional to the actual distance of the craft from its destination and to the distance which it should be therefrom according to its schedule are supplied to amplifier 39.

If the actual distance from the craft to its destination is the same as its scheduled distance, the voltages supplied to computer amplifier 39 through summing resistors 344 and 345 are equal and opposite, and no operation of motor 87 takes place. At this time, the only input to integral control amplifier 38 is that from slider 93, which is grounded at center tap 373, so that no operation of motor 95 can take place either. Accordingly, no mechanical adjustment of single phase winding 83 with respect to three phase winding 82 takes place. It will be appreciated that during the previous operation of the system single phase winding 83 has been brought into positional agreement with single phase winding 144, so that under these conditions no signal is supplied to cause operation of servomotor 54, and the apparatus remains in equilibrium.

If the actual distance from the craft to its destination is not the same as its scheduled distance, the voltage supplied to computing amplifier 39 through summing resistors 344 and 345 are no longer equal and opposite, a residual signal is impressed upon the amplifier, and operation of motor 87 is accordingly initiated.

Operation of motor 87 acts through mechanical connections 86 to displace slider 93 with respect to winding 92, thus supplying an additional or rebalancing voltage through conductors 483 and 594, and summing resistor 343 to amplifier 39. At the same time, operation of motor 87 drives velocity generator 351, inducing a voltage in secondary winding 353 which is transmitted through phasing capacitor 354, conductor 593, and summing resistor 342 to computer amplifier 39. Operation of motor 87 continues until the input to amplifier 39 is zero, the voltage supplied from velocity generator 351 having purely an anti-hunt effect. When the input to amplifier 39 is reduced to zero, operation of motor 87 is interrupted, but its operation has acted through shaft 86, differential 85, and shaft 84 to reposition single phase winding 83 of groundspeed synchro 81, thus changing the voltages induced in three phase winding 82 and conducted to three phase winding 153 of receiver synchro 152. As explained in connection with the airspeed control operation of the apparatus, this results in the appearance of a voltage in airspeed servo amplifier 56, and motor 54 actuates power adjusting apparatus 10 and simultaneously actuates single phase winding 52 of servo synchro 50, the latter adjustment resulting in repositioning of manual lever 64 as also previously described. The new power setting results in a change in airspeed which is sensed by member 146 which displaces single phase winding 144 in a direction to oppose the signal from synchro 81.

The selected values for speed and time set into the apparatus by adjustment of knobs 29 and 32 or by operation of motors 390 and 400 are such as to result, in theory, in operation of the aircraft at the initial position of single phase winding 83 for the entire portion of its flight ending at its destination. However, the settings of knobs 29 and 32 cannot take into account the presence of wind, which is unpredictable both in direction and in magnitude. For flights of craft in the absence of wind, minor irregularities in the operation of the apparatus result in slight discrepancies in speed of the craft which over any period of time have the tendency to average out. However, in the presence of winds having appreciable along course components, the craft tends to continuously gain or lose distance as compared to its scheduled distance to destination at any point, which means that continuous operation of motor 87 is required. Over the course of an extended period, this results in displacement of slider 93 further and further away from center tap 373, until it reaches the end of winding 92, with consequent loss of control. To avoid this, the circuit between slider 93 and summing resistor 340 maintains a voltage on the input to integral control amplifier 38 whenever slider 93 is displaced from center tap 373. This voltage energizes motor 95 to operate, and it acts through shaft 94 and differential 85 to change the position of single phase winding 83 with regard to single phase winding 82 independently of any operation of motor 87. Thus, whenever the craft is off schedule motor 87 operates at once to cause a correction in the airspeed of the craft in a direction to reduce the off schedule condition of the craft, which is a temporary correction, and motor 95 begins a continuous operation at a much slower rate, introducing a permanent change in the position of winding 83 in the same direction. Assuming a constant wind velocity, the result of this arrangement is that when switch 22 is first thrown into its groundspeed position, motor 87 is energized to displace slider 93 from center tap 373, but as long as this displacement of slider 93 continues, motor 95 operates at a much slower rate to still further displace single phase winding 83, requiring opposite movement of slider 93 to maintain a zero input to amplifier 39, and therefore causing operation of motor 87 to return slider 93 to center tap 373.

In addition to controlling the power of the aircraft, through synchro 81, operation of motor 87 is also effective to cause an indication of the position of the craft relative to its scheduled position. Whenever slider 93 is displaced from center tap 373, slider 371 is also displaced from center tap 369 of voltage divider 367, which is energized from secondary winding 333 of transformer 327 through conductors 603 and 604. Center tap 369 and slider 371 are connected to demodulator 366 by conductors 605 and 606, and demodulator 366 energizes the D. C. movement of meter 44 through conductors 607 and 610. Meter 44 is preferably of the center zero type, so that when its needle is displaced in one direction an indication is given that the craft is ahead of schedule, while if the needle is displaced in the other direction, the indication is that the craft is behind schedule.

It should be pointed out that, while indicator 44 is useful when the craft is being automatically controlled to maintain it on schedule, the indicator is still operative even when the power of the craft is being manually controlled through lever 64. The groundspeed control condition of the apparatus is brought about by advancing switch 22 into its groundspeed condition, thus completing the circuit from source 312 through switch 315 through the windings of relays 165, 196, 198, and 206. It should be pointed out, however, that while operation of relays 165, 196, and 206 is essential to automatic control of the craft in accordance with groundspeed, operation of relay 198 alone is sufficient to cause satisfactory operation of indicator 44 to show departure of the craft from its scheduled position, so that the human pilot can manually control the power by lever 64 to maintain the craft on schedule. To establish this condition of operation of the apparatus, the navigator moves switch 22 into its groundspeed condition, and the pilot opens switch 315 so that it is in its manual condition. The energizing circuits for relays 165, 198, and 206 are deenergized at switch 315, so that in general the operation of the apparatus as a whole is that initially described under manual control. However, movement of switch 22 into its groundspeed position has completed the circuit from source 312 through conductor 601 to energize relay 196. The relay operates supplying computer amplifier 39 with the voltages from the navigational and schedule distance computers necessary to its proper operation. Motor 87 is thus energized whenever the craft departs from its scheduled distance to destination, positioning slider 371 so as to supply a voltage through modulator 366 to indicator 44.

Figures 5, 6, 7, and 8 give mechanical details of one embodiment of apparatus used in schedule distance computer 28. An aircraft clock 132 having a winding and setting knob 221 is mounted by four spacers 222 on a plate 223 having a bearing hub 224. A shaft 225 passes through clock 132 and plate 223, carrying knob 32 at its outer end and a pinion 226 at its inner end. Clock 132 is modified by extending the tubular minute hand externally at the rear of the clock, as at 227, to carry an insulating hub 228 upon which is mounted an electrically conducting contact arm 229 carrying a first set of contacts 230 and a second set of contacts 231. Shaft 227 and hub 228 constitute mechanical connection 133, and arm 229 and contacts 230 and 231 constitute slider 127, both shown in Figures 2 and 3. Clock 132 is further modified by disconnecting the second hand from the gear train and mounting it on a shaft 232 passing through shaft 227 and extending rearwardly thereof to carry a hub 233: the second hand accordingly comprises index 138 of Figures 2 and 3.

Spaced from plate 223 by successive sets of spacers 234 and 235 are a pair of further plates 236 and 237, the latter serving as one end bell of motor 400, which is fastened thereto by screws 238 passing through a rear plate 239 serving as the other end bell for the motor. The shaft of motor 400 extends forwardly through plate 237 and carries a pinion 240, which meshes with a gear 241 unitary with a pinion 242, the latter meshing with a gear 243 unitary with a pinion 244 which in turn meshes with a gear 245. This gear is the driven portion of clutch 402, and is frictionally urged by a spring washer 246 against a disc 247 unitary with a shaft 248 journaled in plate 236, and carrying on its other end a pinion 249 unitary with a gear 250. Pinion 249 meshes with a gear 251 unitary with a gear 252: gear 251 meshes with pinion 226 on shaft 225. Gear 252 meshes with a gear 253 carried on one end of a shaft 254 journalled in hub 224 and carrying on its other end a potentiometer block 255. Meshing with gear 250 is a gear 256 carried on the shaft 257 of a helical potentiometer 258 which is mounted on the other side of plate 223, and which provides a balancing signal in time selector 26.

Also mounted on plate 223 by a bracket 259 is an insulated block 260 carrying contact arms 261, 262, 263, and 264 having at their respective ends contacts 265, 266, 267, and 268 electrically engaging slip rings 269, 270, 271 and 272 mounted in annular grooves in the rear of block 255. Shaft 254 and shaft 232 are coaxial, so that a radial pin 273 projecting from hub 233 may engage a radial slot in an axially extending pin 274 mounted eccentrically on block 255: by this arrangement index 138 is rotated simultaneously with block 255 when motor 400 operates. Gears 249, 251, 252, and 253 and shafts 254 and 225 comprise the portion of mechanical connection 134 extending downwardly from clutch 402 in Figure 3, gears 250 and 256 and shaft 257 comprise its upwardly extending portion, and pins 274 and 273 comprise the portion of the shaft extending to the right.

Block 255 is shown as grooved at its outer face to receive an annular winding 130 and a slip ring 275, both of which fastened to the hub by a clamping ring 276. Contacts 230 and 231 are so located on arm 29 as to engage winding 130 and slip ring 275 respectively. Electrical connections are made through block 255 from slip rings 269, 270, 271, and 272 to the ends of winding 130, to an intermediate tap thereon, and to slip ring 275. The structure described is thus capable of performing the functions shown in Figures 2 and 3, the winding and the contact arm being independently rotatable by motor 400 and knob 32 respectively, and the four necessary electrical connections being continuously maintained.

In order that a close fitting cylindrical dust cover may enclose the working parts of this unit, plates 223, 236, 237, and 239 have nearly circular slots 277 near their peripheries to pass electrical conductors leading to contact arms 265, 266, 267, and 268 and to potentiometer 258. Plate 239 is further provided with a similar slot 278 to pass electrical conductors leading to the windings of motor 400 and indicated by the general reference numeral 279.

A multiple pin connector 280 is mounted by a bracket 281 fastened to plate 239 by screws 282, so that the unit as a whole may be readily removable and replaceable in the over-all system. The various components of the unit are maintained in assembled relation by long screws 285 threadedly engaging the rear of the clock housing identified by the numeral 286. It will be apparent that the position of the minute hand 288 of clock 132 indicates the position of contacts 230, depending on the angular position in which hub 228 is fixed to shaft 227, and that index 138 similarly indicates the position of some selected point on winding 130, namely tap 131, as block 255 is rotated. The length of winding 130 is 348 degrees, and tap 131 is located at 330 degrees. When minute hand 288 and index 138 are aligned, contacts 230 are at tap 131. The interval which can be selected by operation of this apparatus is thus 55 minutes.

The use of this component of the apparatus is as follows. In expressing this time, only minutes need be considered since both index 138 and minute hand 288 are capable of unlimited rotation, and since the apparatus is not designed for use with intervals greater than 55 minutes. If the setting is manual, the friction of clutch 402 is overcome by the human operator: if the setting is by motor 400, knob 32 rotates simultaneously with setting of index 138. This setting adjusts the position of tap 131; as time elapses thereafter, minute hand 288 proceeds in clockwise direction, approaching index 138 more closely and simultaneously bringing contacts 230 nearer to tap 131, until at the expiration of the predetermined interval the tap and the slider are together. If operation of the apparatus is allowed to continue, contacts 230 move beyond tap 130 just as minute hand 288 moves past index 138, and the output from the apparatus reverses in sense. Ordinarily, however, the automatic or human control of the craft will have brought it to its destination at the proper time, and groundspeed control of the craft may be then terminated by switch 22.

Numerous objects and advantages of my invention have been set forth in the foregoing description, together with details of the structure and function of the invention, and the novel features thereof are pointed out in the appended claims. The disclosure, however, is illustrative only, and I may make changes in detail, especially in matters of shape, size, and arrangement of parts, within the principle of the invention to the full extent indicated by the broad general meaning of the terms in which the appended claims are expressed.

I claim as my invention:

1. Apparatus of the class described, comprising, in combination: power control means operable through a range of movement to control the power of a movable craft; schedule control means automatically adjustable through a like range of movement in accordance with departure of the craft from scheduled progress along a desired ground path; a power selector adjustable through a like range of movement; manual means and motor means for operating said power selector; and switching means having a first condition in which said power control means is connected to said power selector for anjustment by operation of said manual means, and a second condition in which said power control means and said motor means are connected to said schedule control means for simultaneous operation thereby.

2. Apparatus of the class described comprising, in combination: power control apparatus operable through a range of movement to control the power of a movable craft; schedule control means automatically adjustable through a like range of movement in accordance with departure of the position of the craft from that which would result from movement of the craft at a selected groundspeed; means adjustable to select desired values of groundspeed for said schedule control means; airspeed control means automatically adjusted through a like range of movement in accordance with departure of the airspeed of the craft from a selected value; means adjustable to select desired values of airspeed for said airspeed control means; speed selecting means simultaneously adjusting said groundspeed selecting means and said airspeed selecting means; and means selectively connecting said power control apparatus in controlled relation to said schedule control means or said airspeed control means.

3. Apparatus of the class described comprising, in combination: an airspeed selector; a groundspeed selector; means simultaneously setting said selectors to a desired value; means giving a first control output in accordance with departure of the airspeed of a craft from the selected value; means giving a second control output in accordance with departure of the position of the craft from that which would result from movement of the craft at the selected groundspeed; power control means; switch means causing operation of said power control means in accordance with either of said control outputs; and means connected to said switch means and said third named means for operation when said switch means is causing said operation in accordance with said first control output to maintain said second control output at an initial zero value.

4. Apparatus of the class described comprising in combination: a manual power selector; an automatic power selector; an airspeed selector; a groundspeed selector; airspeed control means giving a first control output in accordance with departure of the airspeed of the craft from the selected value; schedule control means giving a second control output in accordance with departure of the position of the craft from that which would result from movement of the craft at the selected groundspeed; power conrol means; and switch means having first, second, third and fourth conditions in which said power control means is connected for operation in accordance with said manual power selector, said automatic power selector, and said first and second control outputs, respectively.

5. Apparatus of the class described comprising, in combination: a manual power selector; an automatic power selector; an airspeed selector; a groundspeed selector; airspeed control means giving a first control output in accordance with departure of the airspeed of a craft from the selected value; schedule control means giving a second control output in accordance with departure of the position of the craft from that which would result from movement of the craft at the selected groundspeed; power control means; and switch means having a first condition in which said power control means and said groundspeed selector are connected for operation in accordance with said manual power selector, a second condition in which said power control means, said manual power selector, and said groundspeed selector are connected for operation in accordance with said automatic power selector, a third condition in which said power control means, said manual power selector, and said groundspeed selector are connected for operation in accordance with departure of the airspeed of the craft from that selected, and a fourth position in which said power control means and said manual power selector are connected for operation in accordance with departure of the groundspeed of the craft from that selected.

6. Apparatus of the class described comprising, in combination: means for controlling the power of a movable craft; a first self-synchronous device positioned by said power controlling means; a second self-sychronous device positioned in accordance with the actual airspeed of the craft; a third self-synchronous device manually adjustable in accordance with the desired airspeed of the craft; a fourth self-synchronous device; signal means; control means including first switch means connected to all said devices and to said power controlling means for normally causing operation of said controlling means in accordance with the relative positions of said second and third devices, and causing operation of said fourth device to a position determined by that of said first device; and further switch means connected to all said devices for causing operation of said first switch means to cause adjustment of said fourth device in accordance with the signal from said signal means, and to cause operation of said power controlling means in accordance with the relative positions of said second and fourth devices.

7. Apparatus of the class described comprising, in combination: adjustable means for controlling the power of a craft to determine its speed; means giving a first signal in accordance with the adjustment of said power controlling means; means giving a second signal in accordance with departure of the speed of the craft from a selected value; means giving a third signal in accordance with deviation of the craft from a predetermined schedule; an adjustable device for supplying a fourth signal; motor means connected to said power controlling means and said device for causing adjustment thereof; and signal control means interconnecting said signal means, said device, and said motor means and having a first control condition, in which said power controlling means is adjusted in accordance with said second signal and said device is adjusted in accordance with said first signal, and a second control condition in which said device is adjusted in accordance with said third signal and said power controlling means is adjusted in accordance with said second and fourth signals.

References Cited in the file of this patent

UNITED STATES PATENTS

| | | |
|---|---|---|
| 2,018,538 | Webb | Oct. 22, 1935 |
| 2,296,540 | Schurz | Sept. 22, 1942 |
| 2,321,582 | Crane et al. | June 15, 1943 |
| 2,377,011 | Huenergardt | May 29, 1945 |
| 2,472,129 | Streeter | June 7, 1949 |
| 2,500,545 | Herbst | Mar. 14, 1950 |
| 2,612,331 | Frazier et al. | Sept. 30, 1952 |